(12) United States Patent
De Groot (10) Patent No.: US 7,417,743 B2
(45) Date of Patent: Aug. 26, 2008

(54) INTERFEROMETRY SYSTEMS AND METHODS

(75) Inventor: Peter De Groot, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 225 days.

(21) Appl. No.: 11/079,946

(22) Filed: Mar. 15, 2005

(65) Prior Publication Data

US 2005/0200856 A1 Sep. 15, 2005

Related U.S. Application Data

(60) Provisional application No. 60/553,312, filed on Mar. 15, 2004.

(51) Int. Cl.
*G01B 9/02* (2006.01)

(52) U.S. Cl. .................................. 356/512; 356/503

(58) Field of Classification Search ................ 356/489, 356/495, 497, 505, 506, 511–516
See application file for complete search history.

(56) References Cited

U.S. PATENT DOCUMENTS

| | | | |
|---|---|---|---|
| 4,468,122 A * | 8/1984 | Puryaev | 356/513 |
| 6,359,692 B1 | 3/2002 | de Groot | |
| 6,624,894 B2 * | 9/2003 | Olszak et al. | 356/511 |
| 6,744,522 B2 | 6/2004 | De Groot et al. | |
| 6,882,432 B2 * | 4/2005 | Deck | 356/512 |
| 6,924,898 B2 | 8/2005 | Deck | |
| 7,042,578 B2 * | 5/2006 | Deck | 356/514 |
| 7,050,175 B1 * | 5/2006 | Freimann et al. | 356/512 |
| 7,057,738 B2 * | 6/2006 | Millerd et al. | 356/495 |
| 2002/0051134 A1 * | 5/2002 | Ge | 356/512 |
| 2006/0139656 A1 * | 6/2006 | Kulawiec et al. | 356/512 |

OTHER PUBLICATIONS

Dörband, B. et al., "Interferometric testing of optical surfaces at its current limit," *Optik* 112(9):392-298 (2001).
Küchel, M., "The new Zeiss interferometer," *Proceedings of SPIE*, 1332, 655-663 (1990).
Kujawinska, M., "Spatial phase measurement methods," *Interferogram Analysis*, (D.W. Robinson and G.T. Reid, Inst. of Physics Publishing, Bristol and Philadelphia), 145-167 (1993).

(Continued)

*Primary Examiner*—Hwa S Lee (Andrew)
(74) *Attorney, Agent, or Firm*—Fish & Richardson P.C.

(57) ABSTRACT

In general, in a first aspect, the invention features apparatus that include an interferometer having a main cavity and an auxiliary reference surface, the main cavity including a primary reference surface and a test surface. The interferometer is configured to direct a primary portion of input electromagnetic radiation to the main cavity and an auxiliary portion of the input electromagnetic radiation to reflect from the auxiliary reference surface, wherein a first portion of the primary portion in the main cavity reflects from the primary reference surface and a second portion of the primary portion in the main cavity reflects from the test surface. The interferometer is further configured to direct the electromagnetic radiation reflected from the test surface, the primary reference surface, and the auxiliary reference to a multi-element detector to interfere with one another to form an interference pattern.

26 Claims, 3 Drawing Sheets

OTHER PUBLICATIONS

Macy, Jr., W., "Two dimensional fringe-pattern analysis," *Appl. Opt.* 22(23):3898-3901 (1983).

Malacara, D. et al., "Spatial linear and circular carrier analysis," *Interferogram Analysis for Optical Testing*, New York: Marcel Dekker, 285-335 (1998).

Millerd, J. et al., "Pixelated phase-mask dynamic interferometer," *Proceedings of SPIE*, 5531:304-314 (2004).

Smythe, R. et al., "Instantaneous phase measuring interferometry," *Proceedings of SPIE*, 429:16-21 (1983).

\* cited by examiner

INTERFEROMETRY SYSTEMS AND METHODS

CROSS-REFERENCE TO RELATED APPLICATIONS

This application claims priority under 35 USC §119(e)(1) to U.S. Application Ser. No. 60/553,312, entitled "METHOD AND APPARATUS FOR INTERFEROMETRIC PROFILING WITH REDUCED SENSITIVITY TO ENVIRONMENTAL EFFECTS," filed on Mar. 15, 2004, the entire contents of which is hereby incorporated by reference.

BACKGROUND

Interferometric optical techniques are widely used to measure surface profiles of precision optical components.

For example, to measure the surface profile of a test surface, one can use an interferometer to combine a test wavefront reflected from the test surface with a reference wavefront reflected from a reference surface to form an optical interference pattern. Spatial variations in the intensity profile of the optical interference pattern correspond to phase differences between the combined test and reference wavefronts caused by variations in the profile of the test surface relative to the reference surface. Phase-shifting interferometry (PSI) can be used to accurately determine the phase differences and the corresponding profile of the test surface. The surface profile measurement of the test surface is relative to the surface profile of the reference surface, which is assumed to be perfect (e.g., flat) or known within the tolerances of the measurement.

With PSI, the optical interference pattern is recorded for each of multiple phase-shifts between the reference and test wavefronts to produce a series of optical interference patterns that span, for example, at least a half cycle of optical interference (e.g., from constructive, to destructive interference). The optical interference patterns define a series of intensity values for each spatial location of the pattern, wherein each series of intensity values has a sinusoidal dependence on the phase-shifts with a phase-offset equal to the phase difference between the combined test and reference wavefronts for that spatial location. Using numerical techniques known in the art, the phase-offset for each spatial location is extracted from the sinusoidal dependence of the intensity values to provide a profile of the test surface relative the reference surface. Such numerical techniques are generally referred to as phase-shifting algorithms.

The phase-shifts in PSI can be produced by changing the optical path length from the measurement surface to the interferometer relative to the optical path length from the reference surface to the interferometer. For example, the reference surface can be moved relative to the measurement surface. Alternatively, the phase-shifts can be introduced for a constant, non-zero optical path difference by changing the wavelength of the measurement and reference wavefronts. The latter application is known as wavelength tuning PSI and is described, e.g., in U.S. Pat. No. 4,594,003 to G. E. Sommargren.

One type of interferometer that is often used for characterizing a surface of a test object is a Fizeau interferometer. In many embodiments, phase shifting for object surface profiling proceeds by mechanical translation of the reference surface or by wavelength tuning, during which time a computer captures successive frames of an interference pattern at a detector for later analysis.

In a number of situations, it can be attractive to profile surface without temporal modulation of the Fizeau interference pattern, for example, to accommodate high-speed measurements of dynamically actuated parts. Although a variety of such techniques exist for Twymann-Green interferometer geometries, including for example spatial phase shifting or phase shifting based on polarization, these techniques typically require separating the reference and object beam reflections. However, the common-path characteristics of a large-aperture Fizeau interferometer can make it difficult to separate the reference and object beam reflections spatially or by polarization.

SUMMARY

In general, in a first aspect, the invention features apparatus that include an interferometer having a main cavity and an auxiliary reference surface, the main cavity including a primary reference surface and a test surface. The interferometer is configured to direct a primary portion of input electromagnetic radiation to the main cavity and an auxiliary portion of the input electromagnetic radiation to reflect from the auxiliary reference surface, wherein a first portion of the primary portion in the main cavity reflects from the primary reference surface and a second portion of the primary portion in the main cavity reflects from the test surface. The interferometer is further configured to direct the electromagnetic radiation reflected from the test surface, the primary reference surface, and the auxiliary reference to a multi-element detector to interfere with one another to form an interference pattern.

In general, in another aspect, the invention features methods that include directing a primary portion of input electromagnetic radiation to a main cavity of an interferometer, wherein a first portion of the primary portion in the main cavity reflects from a primary reference surface of the main cavity and a second portion of the primary portion in the main cavity reflects from a test surface. The methods further include directing an auxiliary portion of the input electromagnetic radiation to reflect from an auxiliary reference surface of the interferometer, and directing the electromagnetic radiation reflected from the test surface, the primary reference surface, and the auxiliary reference surface to a multi-element detector to interfere with one another forming an interference pattern.

Embodiments of the apparatus and/or methods can include one or more of the following features.

The methods can include determining surface profile information about the test surface based on the interference pattern formed by the electromagnetic radiation reflected from the test surface, the primary reference surface, and the auxiliary reference, and a second interference pattern formed by electromagnetic radiation reflected from the primary reference surface and the auxiliary reference, with no electromagnetic radiation reflected from the test surface reaching the detector.

In embodiments, the primary reference surface can be a partially reflective surface. In some embodiments, the second portion of the primary portion in the main cavity passes through the primary reference surface and reflects from the test surface. The main cavity can define a Fizeau cavity. There can be beam shaping optics in the beam path of second portion between the primary reference surface and the test surface.

The surface area of the auxiliary reference surface can be smaller than that of the primary reference surface. The auxiliary reference surface can be flat and the primary reference surface can be curved. The apparatus can further include a means for selectively preventing electromagnetic radiation from the test surface from reaching the detector. For example, the apparatus can include an aperture between the primary reference surface and the test surface.

The apparatus can further include the multi-element detector and an electronic controller, wherein the electronic controller is configured to determine surface profile information about the test surface based on the interference pattern. The electronic controller can be configured to determine surface profile information about the test surface based on the interference pattern formed by the electromagnetic radiation reflected from the test surface, the primary reference surface, and the auxiliary reference, and a second interference pattern formed by electromagnetic radiation reflected from the primary reference surface and the auxiliary reference, with electromagnetic radiation from the test surface being prevented from the reaching the detector. The auxiliary reference surface can be tilted relative to an optical axis of the interferometer to form spatial carrier fringes in the interference pattern. The apparatus can include a quadrature phase detection system including the multi-element detector. In some embodiments, the auxiliary reference is mounted on a transducer configured to vary an optical path length to the multi-element detector for electromagnetic radiation reflected from the auxiliary reference. The interferometer can include a fold optic (e.g., a mirror or a prism) configured to allow the primary reference surface to be upward facing and part of a mount configured to support the test surface. The interferometer can include a beam splitter (e.g., a non-polarizing beam splitter or a polarizing beam splitter) for separating the primary portion of the input electromagnetic radiation from the auxiliary portion of the input electromagnetic radiation. The interferometer can include one or more imaging optics for imaging the test surface onto the multi-element detector. The apparatus can further include a source for the input electromagnetic radiation (e.g., a laser).

The interferometer can be a Fizeau interferometer, a Michelson interferometer, a Linnik interferometer, or a Mirau interferometer.

In certain aspects, the methods are implemented by an embodiment of the apparatus.

Among other advantages, embodiments of the apparatus and methods can provide Fizeau interferometers that are mechanically stable and relatively insensitive to environmental sources of uncertainty, such as vibrations, which can cause surfaces in the interferometer to move while the interferometer is being used to make measurements on a test part, or between testing different parts. The stability and relative insensitivity to environmental effects result in interferometry systems that are reliable and accurate.

Furthermore, embodiments include interferometry systems than can perform surface profiling measurements based on a single frame of an interference pattern, rather than multiple frames that are commonly required in systems that use phase shifting techniques. Single frame measurements can be performed more rapidly than multiple frame techniques. Furthermore, single frame techniques can eliminate the need for moving parts (e.g., transducers for phase shifting), thereby reducing the cost of interferometry systems.

Single frame measurements using Fizeau interferometers can be implemented without any optical components between the reference surface and test surface. Accordingly, sources of error in measurements made using the Fizeau interferometers are reduced compared to systems that include optical components in the measurement beam path.

Aspects of the invention can be implemented using relatively simple alterations to commercially available interferometry systems. For example, commercially available Fizeau interferometer systems can be readily adapted to include an auxiliary mirror using relatively few additional components, and those components can be relatively inexpensive.

In some embodiments, the apparatus and methods can include mechanical phase-shifting interferometer systems having improved properties compared to conventional phase-shifting systems. For example, Fizeau interferometer systems can include an auxiliary mirror mounted on a transducer, so that the mechanical phase shifting is performed outside of the Fizeau cavity. In large aperture systems, this can be particularly advantageous since the auxiliary mirror can be much smaller in size than the reference mirror, requiring a less complicated transducer system for phase shifting.

Including an auxiliary mirror in a Fizeau interferometer system can allow for relatively easy implementation of quadrature phase measurements using polarization. This allows beam polarization to be managed way from the Fizeau cavity, allowing such phase measurements to be made without including any additional components (e.g., a quarter wave plate) between the reference and test surfaces.

Auxiliary mirrors also provide a convenient way to measure phases using carrier fringe techniques. In certain embodiments, for example, carrier fringes can be introduced into an interference pattern generated using a Fizeau interferometer by tilting the auxiliary mirror relative to the beam path, rather than the reference mirror. Tilting the auxiliary mirror also allows one to make measurements with the reference mirror orientated on the null position.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Embodiments described below include Fizeau interferometers that are augmented by the inclusion of an auxiliary reference mirror. The auxiliary reference mirrors allow a variety of interferometry techniques to be implemented using a Fizeau interferometer without having to introduce any additional components between the Fizeau's reference and test surfaces or altering the alignment between these surfaces. For example, the auxiliary mirror can be configured to introduce carrier fringes into a Fizeau interference pattern, enabling characterization of a test surface from a single interferogram frame formed using the test surface. Furthermore, as another example, the auxiliary mirror enables quadrature phase measurements using polarization to be implemented in a Fizeau interferometer relatively easily and without requiring additional optical components between the reference and test surfaces of the Fizeau interferometer. Since any optical components in the measurement beam path are sources of first order errors in measurements made using a Fizeau interferometer, using an auxiliary mirror can allow these techniques to be implemented without any substantial loss in system accuracy.

Auxiliary reference mirrors can also be used to implement mechanical phase shifting in a Fizeau interferometer without moving either of the reference or test surfaces. The environmental stability associated with the stationary Fizeau cavity can enhance the system's accuracy and repeatability.

Figure 1:
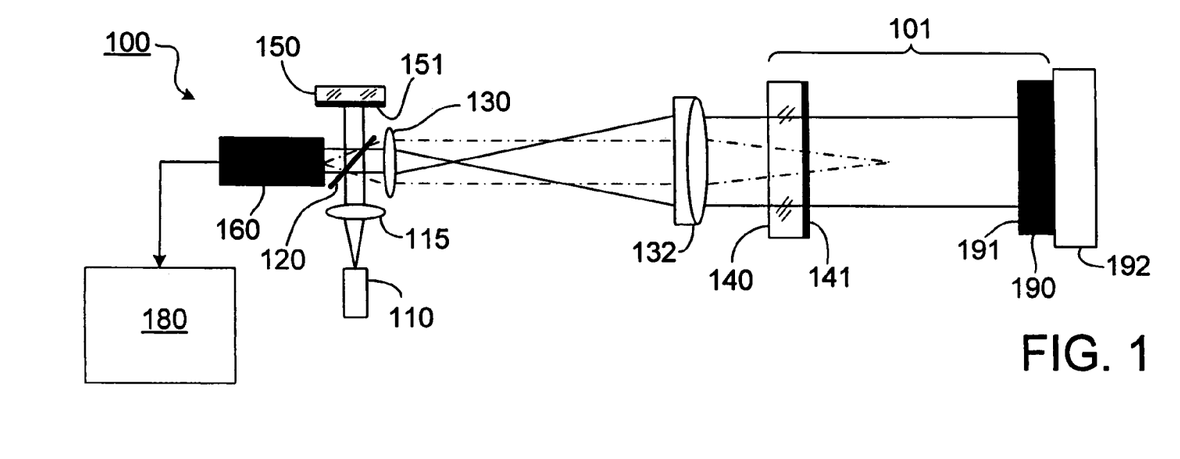
FIG. 1 is a diagram showing an embodiment of an interferometry assembly that includes a Fizeau interferometer augmented by an auxiliary reference mirror.

Referring to FIG. 1, interferometry system 100 is adapted to measure the optical interference produced by reflections from a reference surface 141 of a reference optic 140, a test surface 191 of a test object 190 (e.g., an optical flat), and a surface 151 of an auxiliary reference mirror 150, which may be substantially smaller than reference optic 140. Reference surface 141 and test surface 191 define a Fizeau cavity, labeled as cavity 101 in FIG. 1. System 100 includes a mount 192 for supporting test object 190 relative to reference optic 150.

Interferometry system 100 also includes a beam splitter 120 that separates a beam from a light source (e.g., a laser diode, HeNe laser or the like) into two component beams, corresponding to a reflected component and a transmitted components of the input beam. The reflected component is directed towards Fizeau cavity 101, while the transmitted components is directed towards auxiliary reference mirror 150. Beam splitter 120 also combines light reflected from Fizeau cavity 101 and from auxiliary reference mirror 150, and directs the combined light beam to a pixelated detector 160 (e.g., a CCD camera).

As depicted in FIG. 1, interferometry system 100 also includes several optical components, including a collimating lens 115 that collimates diverging light from source 110 before the light is incident on beam splitter 120. Interferometry system 100 also includes beam shaping optics, namely lenses 130 and 132, which expand the light reflected by beam splitter 120 prior to contacting reference optic 140. In general, interferometry systems 100 can include further optical components in addition to collimating lens 115 and beam shaping lenses 130 and 132.

During operation, source 110 illuminates beam splitter 120, which transmits a portion of the illumination to reflect from auxiliary reference mirror surface 151, and reflects a portion of the illumination towards Fizeau cavity 101. This illumination is partly transmitted by reference optic 140 and reflects from surface 191 of test object 190. In addition, a portion of the illumination incident on reference optic 140 from beam splitter 120 is reflected by reference surface 141. Illumination reflected from reference surface 141 and from test object surface 191 propagate along a common path from Fizeau cavity 101 back through beam splitter 120 onto detector 160. In addition, beam splitter reflects a portion of illumination reflected from surface 151 of auxiliary reference mirror 150 towards detector 160. Wavefronts incident on detector 160 from mirror 150, reference surface 141, and test object surface 191 interfere, generating a pattern of fringes of varying intensity.

Interferometry system 100 includes an electronic controller 180, which is in communication with detector 160. Electronic controller 180 includes a frame grabber for storing images detected by detector 160. Electronic controller 180 analyzes the images stored by the frame grabber, and provides a user with information about test surface 191 based on the analysis.

Auxiliary reference mirror 150 is nominally flat and is oriented so that mirror surface 151 is tilted with respect to the path of illumination reflected from reference surface 141 to introduce carrier fringes to the interference pattern formed by the measurement and reference wavefronts at detector 160. In general, the tilt is sufficient to introduce multiple fringes into an interference pattern formed by wavefronts reflected from auxiliary reference mirror 150 and wavefronts reflected from reference surface 141. In some embodiments, auxiliary reference mirror 150 is oriented so that the carrier fringes have a period corresponding to about three or more detector pixels at detector 160 (e.g., about five or more, about eight or more, about 10 or more, about 20 or more detector pixels). Auxiliary reference mirror 150 can be mounted on an adjustable mount to facilitate easy adjustment of the auxiliary mirror's orientation.

Determining a surface profile of test surface 191 using interferometry system 100 involves a two-step process: one interferometer measurement without the test object 191 and one measurement with the test object. For each measurement, electronic controller 180 determines an interference phase, θ, and a signal modulation, M, for the image data at each detector pixel.

One way to extract phase information from each measurement is to perform a spatial Fourier transform of the interference pattern and subsequently identify the carrier fringe frequency with a digital filter in the frequency domain. An inverse transform of the filtered spectrum provides the phase θ and signal modulation M information at each pixel. Phase extraction methods using Fourier transforms are described, for example, by W. Macy in "Two Dimensional Fringe Pattern Analysis," *Appl. Opt.*, 22, pp. 3898-3901 (1983), the entire contents of which are hereby incorporated by reference.

The surface height profile for test surface 141 is related to the phase information for each measurement based on the following derivation. In FIG. 1, when test optic 140 is not included in the system, the system measures the complex reflectivity $r_2 t^2$ with respect to $r_1$, where $r_1$ is the effective amplitude reflectivity of the auxiliary reference, $r_2$ is the internal amplitude reflectivity of reference surface 141, and t is the effect of transmission through the beam shaping optics and through the substrate of the reference optic 140.

Setting aside irrelevant overall constants related to cavity length and phase change on reflection effects, the measured phase at each pixel is given by $$\theta_A = \theta'_2 - \theta_1 \tag{1}$$

where $$\theta_1 = \arg(r_1) \tag{2}$$

$$\theta'_2 = \arg(t^2 r_2). \tag{3}$$

Here $$r_1 = \sqrt{R_1} \exp(i\theta_1) \tag{4}$$

$$r_2 = \sqrt{R_2} \exp(i\theta_2) \tag{5}$$

$$t = \sqrt{T} \exp(i\theta_t) \tag{6}$$

and therefore $$\theta'_2 = 2\theta_1 + \theta_2. \quad (7)$$

The phase values relate to surface heights according to $$\theta_1 = 2kh_1 \quad (8)$$

$$\theta_2 = 2kh_2 \quad (9)$$

for $$k = 2\pi/\lambda \quad (10)$$

and $\lambda$ is the source wavelength.

The measured signal modulation can be expressed as follows:

$$M_A = 2V\, T\sqrt{R_1 R_2} \quad (11)$$

where V is a fringe visibility coefficient, assumed to be independent of field position and constant over time.

For the interference pattern acquired with test object 190 included, the ray tracing is common path for light reflected from test surface 191 and reference surface 141, with a phase measurement for each pixel now given by $$\theta_B = \theta'_Z - \theta_1 \quad (12)$$

where $$\theta'_Z = 2\theta_1 + \theta_Z. \quad (13)$$

and the phase $\theta_Z$ returned by the Fizeau cavity itself is $$\theta_Z = \arg(z) \quad (14)$$

For $$z = (r_2 + r_3). \quad (15)$$

The measured signal modulation is $$M_B = 2V\, T\sqrt{R_1 Z} \quad (16)$$

where $Z = |z|^2$.

The phase term, $\theta_3$, corresponding to the surface profile of test surface 191 at each pixel, is determined from the measured phases and signal modulations as follows. The complex reflectivity, z, of Fizeau cavity 101 can be calculated for each pixel from the measured data from:

$$z = \frac{M_B}{2VT\sqrt{R_1}} \exp[i(\theta_B - \theta_A + \theta_2)]. \quad (17)$$

The reflectivity of reference surface 141 is from Eq. (11) and Eq. (5)

$$r_2 = \frac{M_A}{2VT\sqrt{R_1}} \exp(i\theta_2). \quad (18)$$

Therefore, since from Eq. (15)

$$r_3 = z - r_2, \text{ one has} \quad (19)$$

$$r_3 = \frac{\exp(i\theta_2)}{2VT\sqrt{R_1}}[M_B \exp(i\theta_B - i\theta_A) - M_A], \quad (20)$$

the complex argument of which is the desired phase:

$$\theta_3 = \arg[M_B \exp(i\theta_B - i\theta_A) - M_A] + \theta_2. \quad (21)$$

Where the profile of reference surface, $h_2$, is known, equation (21) allows one to determine the surface profile of test surface 191 independent of the effects t of the optical system.

In certain embodiments, it may be desirable to reduce the reflectivity of reference surface 141. In such instances, an antireflection (AR) coating can be applied to reference surface 141. This reduces the finesse of Fizeau cavity 101, which can reduce the effect of errors associated with instability of the optical path between reference surface 141 and auxiliary mirror surface 151. For example, the technique as described above is sensitive to the drift of the "internal" cavity formed by reference surface 141 and auxiliary mirror reference surface 151 than may occur between the first and the second measurements, potentially introducing measurement errors in unstable environments. The sensitivity is generally greatest for high-finesse fringes between $r_2$ and $r_3$. The magnitude of the print through declines with the finesse of Fizeau cavity 101, which is reduced when an AR coating is applied to reference surface 141. For example, if $R_2 = 0.5\%$ and $R_3 = 4\%$, the resulting errors for an internal cavity (i.e., the cavity formed by reference surface 141 and auxiliary mirror surface 151) drift are reduced by a factor of three.

Alternatively, or additionally, interferometer system 100 can be designed to be sufficiently rigid to substantially prevent any internal cavity drift between first and second measurements associated with characterizing a part.

In certain embodiments, the stability of the internal cavity can be monitored between measurements by including a portion of the interferometer system that monitors the interference pattern associated with the internal cavity regardless of whether or not a test object is positioned in the system. For example, an annulus can be provided in the field of view of detector 160 that examines only reference surface 141, and excludes the test surface 191 reflection, $r_3$.

Figure 2:
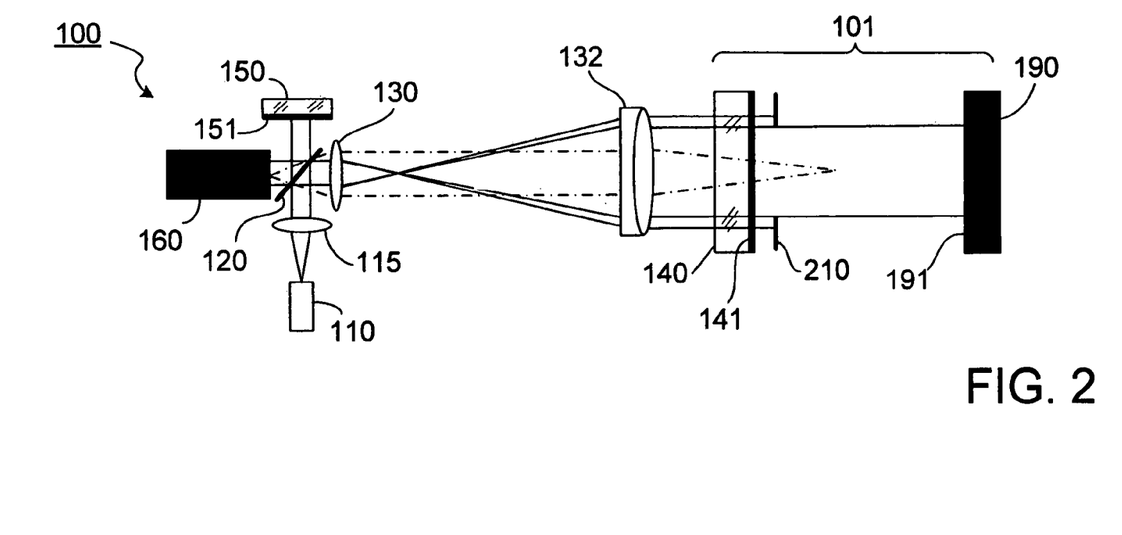
FIG. 2 is a diagram showing the interferometry assembly from FIG. 1 modified to have a narrow annular aperture, blocking the view of the object and therefore preserving a portion of the single-surface reflection from the Fizeau reference.

Referring to FIG. 2, in some embodiments, an annulus can be provided by including an aperture 210 within Fizeau cavity 101. For example, if test object 190 is larger than the system's field of view, aperture 210 excludes reflections from test surface 151 by masking portions of the test surface.

Including such an annulus in interferometer 100 allows one to determine the relative tip, tilt and piston of the internal cavity every time a measurement is made. The measured drift values modify the Eq. (21) to $$\theta_3 = \arg[M_B \exp(i\theta_B - i\theta_A + i\theta_{drift}) - M_A] + \theta_2, \quad (22)$$

where $\theta_{drift}$ is the phase change at a pixel associated with the drift in the internal cavity between measurements.

Figures 3, 4:
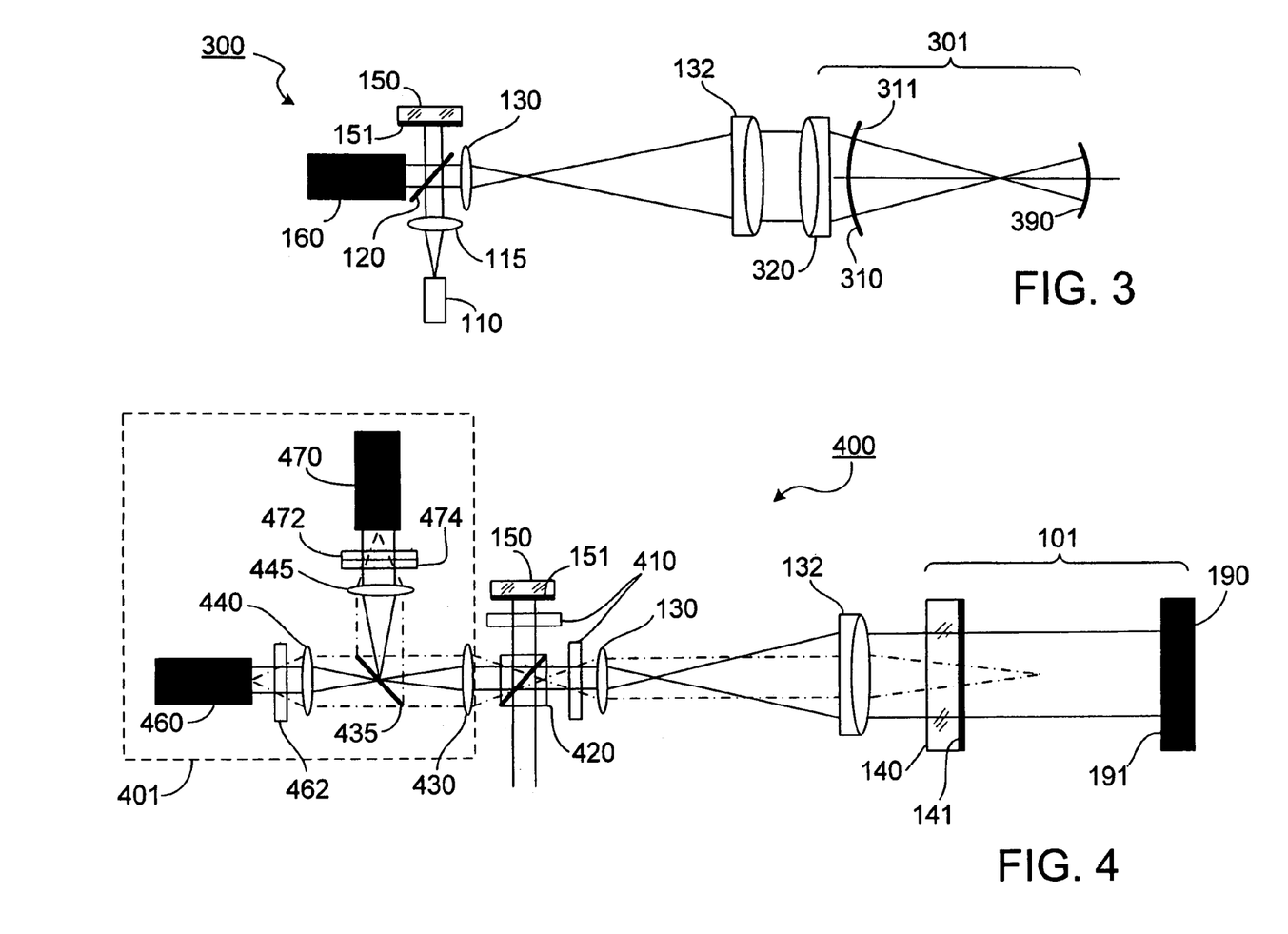
FIG. 3 is a diagram showing an embodiment of an interferometry assembly that includes a spherical Fizeau cavity and an auxiliary reference mirror.
FIG. 4 is a diagram showing an embodiment of an interferometry assembly that includes a Fizeau interferometer augmented by an auxiliary reference mirror configured for instantaneous quadrature phase measurement using polarization.

Referring to FIG. 3, an interferometry system 300 can be adapted for profiling a curved test surface of a test object 390. Interferometry system 300 includes a reference object 310 that has a curved (e.g., spherical) reference surface 311. Reference object 310 and test object 390 defines a Fizeau cavity 301. The interferometry system's beam shaping optics also includes an additional lens 320 which focuses illumination from beam splitter 120 so that it is nominally normally incident on the curved surface of test object 390. Aside from the different geometry of the Fizeau cavity, the operation of interferometry system 300 is the same as interferometry system 100.

While in the preceding embodiments phase information is determined using carrier fringes, in general, other techniques can also be used. For example, in some embodiments phase measurements can be obtained from a single interference pattern using polarization to provide phase quadrature between orthogonal polarizations in the interference pattern. Referring to FIG. 4, an example of an interferometry system adapted for phase quadrature measurements using polarization is interferometry system 400. System 400 includes a polarizing beam splitter (PBS) 420 which splits incident illumination from source 110 (not shown in FIG. 4) into component beams having orthogonal linear polarization states. One beam reflects from surface 151 of auxiliary reference mirror 150, while the other reflects from the reference and test surface of Fizeau cavity 101. Quarter wave plates 410 are positioned in the path of each beam so that the polarization state of each beam is rotated by 90 degrees. This ensures that the beam originally transmitted by PBS 420 is now reflected, and the originally reflected beam, now reflected from Fizeau cavity 101, is transmitted by the PBS.

PBS 420 directs illumination reflected from auxiliary reference mirror 150 and Fizeau cavity 101 towards a detector assembly 401 that includes pixelated detectors 460 and 470, and non-polarizing beam splitter 435. Detector assembly 401 also includes lenses 430, 440, and 445, which serve to focus and collimate the illumination from PBS 420. Beam splitter 435 reflects a portion of the incoming illumination from PBS 420 toward detector 470, and transmits a portion towards detector 460. A linear polarizer is positioned between each detector and beam splitter 435. In particular, polarizer 462 is positioned in front of detector 460, and polarizer 472 is positioned in front of detector 470. Both polarizers are oriented at 45 degrees with respect to the transmission axis of PBS 420, ensuring that both detectors sample illumination reflected from both the auxiliary reference mirror and the Fizeau cavity. A quarter waveplate is positioned between polarizer 472 and beam splitter 435, and is oriented to introduce a 90 degree phase shift into the polarization state transmitted by polarizer 472. Accordingly, the interference phase of the interference pattern at each detector pixel for one detector is offset by 90 degrees relative to the phase of the interference pattern at the corresponding pixel of the other detector.

Signals in quadrature allow for rapid measurement of modulation and phase assuming that the constant intensity offset $I^{DC}$ is known. Thus if the measured intensity without the object for one camera is $$g_A = I_A^{DC} + M_A \cos(\theta_A) \quad (23)$$

then for the other camera in quadrature the intensity is $$g_A^{quad} = I_A^{DC} + M_A \sin(\theta_A) \text{ then} \quad (24)$$

$$\tan(\theta_A) = \frac{g_A^{quad} - I_A^{DC}}{g_A - I_A^{DC}} \quad (25)$$

$$M_A^2 = \left(g_A^{quad} - I_A^{DC}\right)^2 + \left(g_A - I_A^{DC}\right)^2 \quad (26)$$

To determine $I_A^{DC}$, one can make a separate measurement with the auxiliary reference either highly tilted or in rapid movement so as to average out the modulation terms $M_A \cos(\theta_A)$ and $M_A \sin(\theta_A)$. In an alternative embodiment, the addition of at least one more camera with an additional phase shift provides sufficient information to solve for modulation, average intensity and phase simultaneously, as described by R. Smythe and R. Moore, Proc. Soc. Phot. Opt. Eng. 429, 16 (1983).

In further embodiments, polarization-encoded reference and measurement beams project multiple images at various phase shifts onto a single camera detector, in a manner similar to that described by Kujawinska et al. in the Chapter "Spatial phase measurement methods," in *Interferogram Analysis: Digital Fringe Pattern Measurement Techniques*, edited by David W. Robinson and Graeme T. Reid, Institute of Physics Publishing, Philadelphia, Pa. (May 1, 1993), the entire contents of which are hereby incorporated by reference, and by James Millerd, et al., in "Pixelated Phase-Mask Dynamic Interferometer," Proc. SPIE, Vol. 5531 (2004), the entire contents of which are hereby incorporated by reference.

Figure 5:
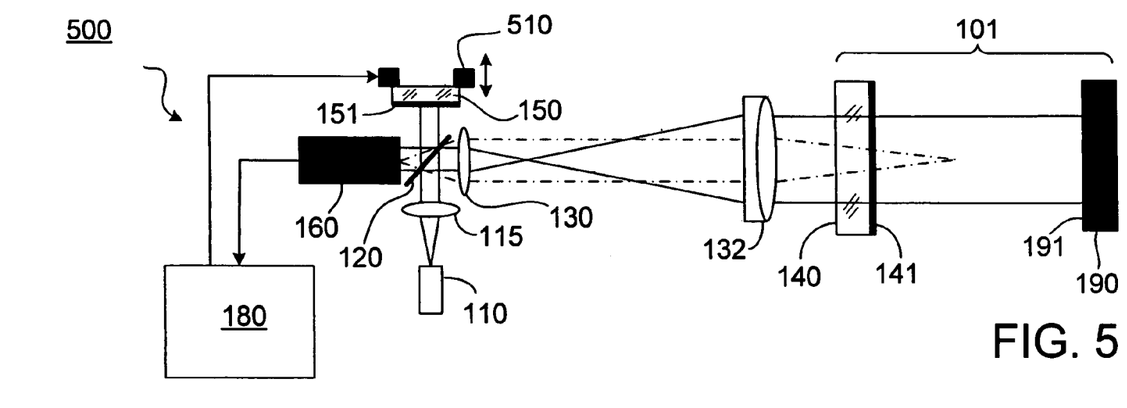
FIG. 5 is a diagram showing an embodiment of an interferometry assembly that includes a Fizeau interferometer augmented by an auxiliary reference mirror configured for phase measurement using mechanical phase shifting of the auxiliary reference mirror.

In some embodiments, mechanical phase shifting can be used to determine phase information in interferometry systems that include auxiliary mirrors. For example, referring to FIG. 5, in an interferometry system 500, auxiliary mirror 150 is mounted on a transducer 510 (e.g., a piezoelectric transducer) which varies the optical path length between auxiliary reference surface 151 and beam splitter 120. Transducer 510 is controlled by signals from electronic controller 180, which synchronizes data acquisition at detector 160 with the motion of the auxiliary reference mirror. Transducer 510 displaces auxiliary reference mirror 150 smoothly over a range of approximately one wavelength, thereby introducing a sequence of N phase shift increments α while detector 160 records corresponding N intensity values $g_j$ for j=0..N−1 for each image pixel, as described, e.g., in Encyclopedia of Optics, vol. 3 (2004, Wiley-VCH Publishers, Weinheim) pp. 2100-2101. For example, for N=7 and phase shift increments α=π/2, the phase is given by $$\tan(\theta) = \frac{7(g_2 - g_4) - (g_0 - g_6)}{-4(g_1 + g_5) + 8g_3} \quad (27)$$

and the signal modulation is given by $$M^2 = \frac{[7(g_2 - g_4) - (g_0 - g_6)]^2 + [8g_3 - 4(g_1 + g_5)]^2}{16^2}. \quad (28)$$

Alternatively, or additionally, other methods of determining interference phase and modulation with the aid of an auxiliary reference mirror can be used.

In the embodiments described above, the aperture of the Fizeau cavity is sufficiently large to capture reflections from the entire test surface. This is achieved, in part, by using a large reference optic (e.g., the size of reference surface 141 is the same size or larger than the size of test surface 191). Indeed, where an interferometry system is designed for characterizing large test parts, the corresponding reference optic can be large and heavy. Mechanical phase shifting by translating the small auxiliary mirror can be advantageous since the size of the Fizeau aperture does not place the same size requirements on the auxiliary mirror as it does for the reference optic 140. Accordingly, the transducer can by smaller and simpler compared to a transducer for reference optic 140. Furthermore, due to the physical distance between the auxiliary reference and the Fizeau cavity, the auxiliary reference mirror can be physically isolated more effectively from the test object compared to reference object 140, providing better stability of the Fizeau cavity during data aquisition.

Figure 6:
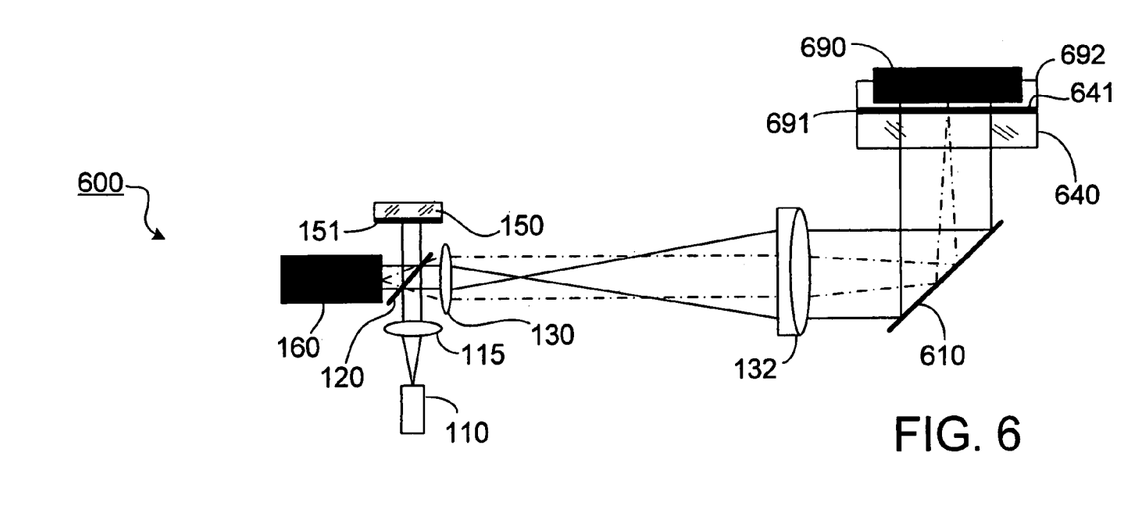
FIG. 6 is a diagram showing an embodiment of an interferometry assembly that includes an upward-looking Fizeau interferometer augmented by an auxiliary reference.

Referring to FIG. 6, in some embodiments, interferometry systems can be configured to be upward-looking, for easy test part handling. Interferometry system 600, for example, includes a fold mirror 610 between beam splitter 120 and the reference object 640 and test part 690. fold mirror 610 directs illumination from beam splitter 120 along a vertical path to illuminate reference optic 640 which lies in a horizontal plane. Test part 690 can be easily mounted with test surface 691 relative to reference surface 641 by laying the test part horizontally on a mount 692 that maintains a small amount of separation between test surface 691 and reference surface 641. Since gravity automatically aligns the test part to reference object 640, tip and tilt alignments can be eliminated for all flat parts, regardless of size, in this configuration.

While the foregoing embodiments involve the use of an auxiliary mirror in conjunction with a Fizeau interferometer, in general, the phase and magnitude techniques using an auxiliary mirror can be used with other types of interferometers as well. For example, the phase and magnitude techniques using an auxiliary mirror can be adapted for use with a conventional interference microscope objective, such as a Mirau, Michelson or Linnik. Conventional interference microscopes can be adapted to include an auxiliary reference mirror with relatively little modification of the standard geometry.

A number of embodiments of the invention have been described. Nevertheless, it will be understood that various modifications may be made without departing from the spirit and scope of the invention. Accordingly, other embodiments are within the scope of the following claims.

What is claimed is:

1. Apparatus comprising:
   an interferometer comprising a main cavity and an auxiliary reference surface, the main cavity comprising a partially reflective surface defining a primary reference surface and a test surface,
   the interferometer being configured to direct a primary portion of input electromagnetic radiation to the main cavity and an auxiliary portion of the input electromagnetic radiation to reflect from the auxiliary reference surface, wherein a first portion of the primary portion in the main cavity reflects from the primary reference surface and a second portion of the primary portion in the main cavity passes through the primary reference surface and reflects from the test surface,
   the interferometer being further configured to direct the electromagnetic radiation reflected from the test surface, the primary reference surface, and the auxiliary reference surface to a multi-element detector to interfere with one another to form an interference pattern,
   wherein the auxiliary reference surface is tilted so that the paths of the electromagnetic radiation reflected from the primary reference surface and auxiliary reference are non-parallel at the multi-element detector.

2. The apparatus of claim 1, wherein the main cavity defines a Fizeau cavity.

3. The apparatus of claim 1, wherein there are no beam shaping optics in the beam path of second portion between the primary reference surface and the test surface.

4. The apparatus of claim 1, wherein the surface area of the auxiliary reference surface is smaller than that of the primary reference surface.

5. The apparatus of claim 1, wherein the auxiliary reference surface is flat and the primary reference surface is curved.

6. The apparatus of claim 1, further comprising a means for selectively preventing electromagnetic radiation from the test surface from reaching the detector.

7. The apparatus of claim 1, further comprising the multi-element detector and an electronic controller, wherein the electronic controller is configured to determine surface profile information about the test surface based on the interference pattern.

8. The apparatus of claim 7, wherein the electronic controller is configured to determine surface profile information about the test surface based on the interference pattern formed by the electromagnetic radiation reflected from the test surface, the primary reference surface, and the auxiliary reference, and a second interference pattern formed by electromagnetic radiation reflected from the primary reference surface and the auxiliary reference, with no electromagnetic radiation reflected from the test surface reaching the detector.

9. The apparatus of claim 1, wherein the auxiliary reference surface is tilted relative to an optical axis of the interferometer to form spatial carrier fringes in the interference pattern.

10. The apparatus of claim 1, further comprising a quadrature phase detection system including the multi-element detector.

11. The apparatus of claim 1, wherein the interferometer comprises a fold optic configured to allow the primary reference surface to be upward facing and part of a mount configured to support the test surface.

12. The apparatus of claim 1, wherein the interferometer comprising a beam splitter for separating the primary portion of the input electromagnetic radiation from the auxiliary portion of the input electromagnetic radiation.

13. The apparatus of claim 1, wherein the interferometer comprises one or more imaging optics for imaging the test surface onto the multi-element detector.

14. The apparatus of claim 1, further comprising a source for the input electromagnetic radiation.

15. The apparatus of claim 1, wherein the auxiliary reference is coupled to a transducer configured to vary an optical path length of electromagnetic radiation reflected from the auxiliary reference to the detector.

16. A method, comprising:
    directing a primary portion of input electromagnetic radiation to a main cavity of an interferometer, wherein a first portion of the primary portion in the main cavity reflects from a primary reference surface of the main cavity and a second portion of the primary portion in the main cavity passes through the primary reference surface and reflects from a test surface;
    directing an auxiliary portion of the input electromagnetic radiation to reflect from an auxiliary reference surface of the interferometer; and
    directing the electromagnetic radiation reflected from the test surface, the primary reference surface, and the auxiliary reference surface to a multi-element detector to interfere with one another forming an interference pattern,
    wherein the auxiliary reference surface is tilted so that the paths of the electromagnetic radiation reflected from the primary reference surface and auxiliary reference are non-parallel at the multi-element detector.

17. The method of claim 16, further comprising determining surface profile information about the test surface based on the interference pattern.

18. A system, comprising:
    an interferometer comprising a main cavity and an auxiliary reference surface, the main cavity comprising a primary reference surface and a test surface, wherein the interferometer is configured to direct a primary portion of input electromagnetic radiation to the main cavity and an auxiliary portion of the input electromagnetic radiation to reflect from the auxiliary reference surface, wherein a first portion of the primary portion in the main cavity reflects from the primary reference surface, a second portion of the primary portion in the main cavity reflects from the test surface, the primary portion does not contact the auxiliary reference surface, and the auxiliary portion does not contact the primary reference surface or the test surface, the interferometer being further configured to direct the electromagnetic radiation reflected from the test surface, the primary reference surface, and the auxiliary reference surface to a multi-element detector to interfere with one another to form an interference pattern; and an electronic controller configured to determine surface profile information about the test surface based on the interference pattern formed by the electromagnetic radiation reflected from the test surface, the primary reference surface, and the auxiliary reference surface, and a second interference pattern formed by electromagnetic radiation reflected from the primary reference surface and the auxiliary reference, with no electromagnetic radiation reflected from the test surface reaching the detector.

19. The system of claim 18, wherein the primary reference surface is a partially reflective surface.

20. The system of claim 19, wherein the second portion of the primary portion in the main cavity passes through the primary reference surface and reflects from the test surface.

21. The system of claim 18, wherein the interferometer is a Fizeau interferometer, a Michelson interferometer, a Linnik interferometer, or a Mirau interferometer.

22. A method, comprising:
directing a primary portion of input electromagnetic radiation to a main cavity of an interferometer, wherein a first portion of the primary portion in the main cavity reflects from a primary reference surface of the main cavity and a second portion of the primary portion in the main cavity reflects from a test surface;

directing an auxiliary portion of the input electromagnetic radiation to reflect from an auxiliary reference surface of the interferometer;

directing the electromagnetic radiation reflected from the test surface, the primary reference surface, and the auxiliary reference to a multi-element detector to interfere with one another forming an interference pattern; and determining surface profile information about the test surface based on the interference pattern formed by the electromagnetic radiation reflected from the test surface, the primary reference surface, and the auxiliary reference, and a second interference pattern formed by electromagnetic radiation reflected from the primary reference surface and the auxiliary reference, with no electromagnetic radiation reflected from the test surface reaching the detector, wherein the primary portion does not contact the auxiliary reference surface and the auxiliary portion does not contact the primary reference surface or test surface.

23. The method of claim 22, wherein the second portion of the primary portion passes through the primary reference surface and reflects from the test surface.

24. The apparatus of claim 1, wherein a path of the primary portion of the electromagnetic radiation does not intersect the auxiliary reference surface.

25. Apparatus comprising: an interferometer comprising a main cavity and an auxiliary reference surface, the main cavity comprising a partially reflective surface defining a primary reference surface and a test surface, the interferometer being configured to direct a primary portion of input electromagnetic radiation to the main cavity and an auxiliary portion of the input electromagnetic radiation to reflect from the auxiliary reference surface, wherein a first portion of the primary portion in the main cavity reflects from the primary reference surface and a second portion of the primary portion in the main cavity passes through the primary reference surface and reflects from the test surface, the interferometer being further configured to direct the electromagnetic radiation reflected from the test surface, the primary reference surface, and the auxiliary reference surface to a multi-element detector to interfere with one another to form an interference pattern, wherein the auxiliary reference surface is attached to an adjustable mount, the adjustable mount being positioned to orient the auxiliary reference surface relative to the multi-element detector so that the auxiliary portion of the electromagnetic radiation introduces multiple spatial carrier fringes in the interference pattern at the multi-element detector.

26. A method, comprising:

directing a primary portion of input electromagnetic radiation to a main cavity of an interferometer, wherein a first portion of the primary portion in the main cavity reflects from a primary reference surface of the main cavity and a second portion of the primary portion in the main cavity passes through the primary reference surface and reflects from a test surface;

directing an auxiliary portion of the input electromagnetic radiation to reflect from an auxiliary reference surface of the interferometer; and directing the electromagnetic radiation reflected from the test surface, the primary reference surface, and the auxiliary reference surface to a multi-element detector to interfere with one another forming an interference pattern; and adjusting an orientation of the auxiliary reference surface with respect to the multi-element detector to provide multiple spatial carrier fringes in the interference pattern at the multi-element detector.

* * * * *